United States Patent [19]
Percorini et al.

[11] 3,760,258
[45] Sept. 18, 1973

[54] STATIC INVERTER

[75] Inventors: Marcello Percorini; Vittorio DiNunzio; Giuseppe Careglio, all of Turin, Italy

[73] Assignee: Compagnia Italiana Westinghouse Freni e Segnali, Torino, Italy

[22] Filed: July 28, 1972

[21] Appl. No.: 276,251

[30] Foreign Application Priority Data
Dec. 29, 1971 Italy.............................. 71265 A/71

[52] U.S. Cl..................... 321/11, 321/16, 321/45 R
[51] Int. Cl. ............................................ H02m 1/18
[58] Field of Search............................321/11–13

[56] References Cited
UNITED STATES PATENTS
| | | | |
|---|---|---|---|
| 3,569,819 | 3/1971 | Martzloff et al...................... | 321/12 |
| 3,611,043 | 10/1971 | Steen ................................. | 321/13 X |
| 3,412,309 | 11/1968 | Boonstra............................. | 321/12 |

*Primary Examiner*—William M. Shoop, Jr.
*Attorney*—Ralph W. McIntire, Jr.

[57] ABSTRACT

A static inverter system for high power applications providing built-in protection against short circuits appearing in either the inverter or the load. Thyristors arranged in a common bridge network of the inverter have their firing signals terminated when strategically located current sensors indicate, by means of a threshold circuit, that a short circuit has developed, in response to which an oscillating circuit produces a free oscillation of current to reverse bias of the thyristors during a semi-period of the oscillating cycle, thereby terminating current conduction by the thyristors for a duration sufficient to allow the thyristors to regain their normal resistance to forward conduction. In the nonconducting condition, the thyristors block current flow in the inverter system and accordingly protect the inverter components, as well as the thyristors themselves from damage due to excessive levels of current. The system further includes means for periodically restoring the thyristor firing circuitry to provide for automatic resumption of normal inverter operation in the event the short circuit condition is only transient. If the short circuit condition still exists after a predetermined number of such restorations, the thyristor firing signals are permanently extinguished until the fault is corrected and the system is manually reset.

8 Claims, 4 Drawing Figures

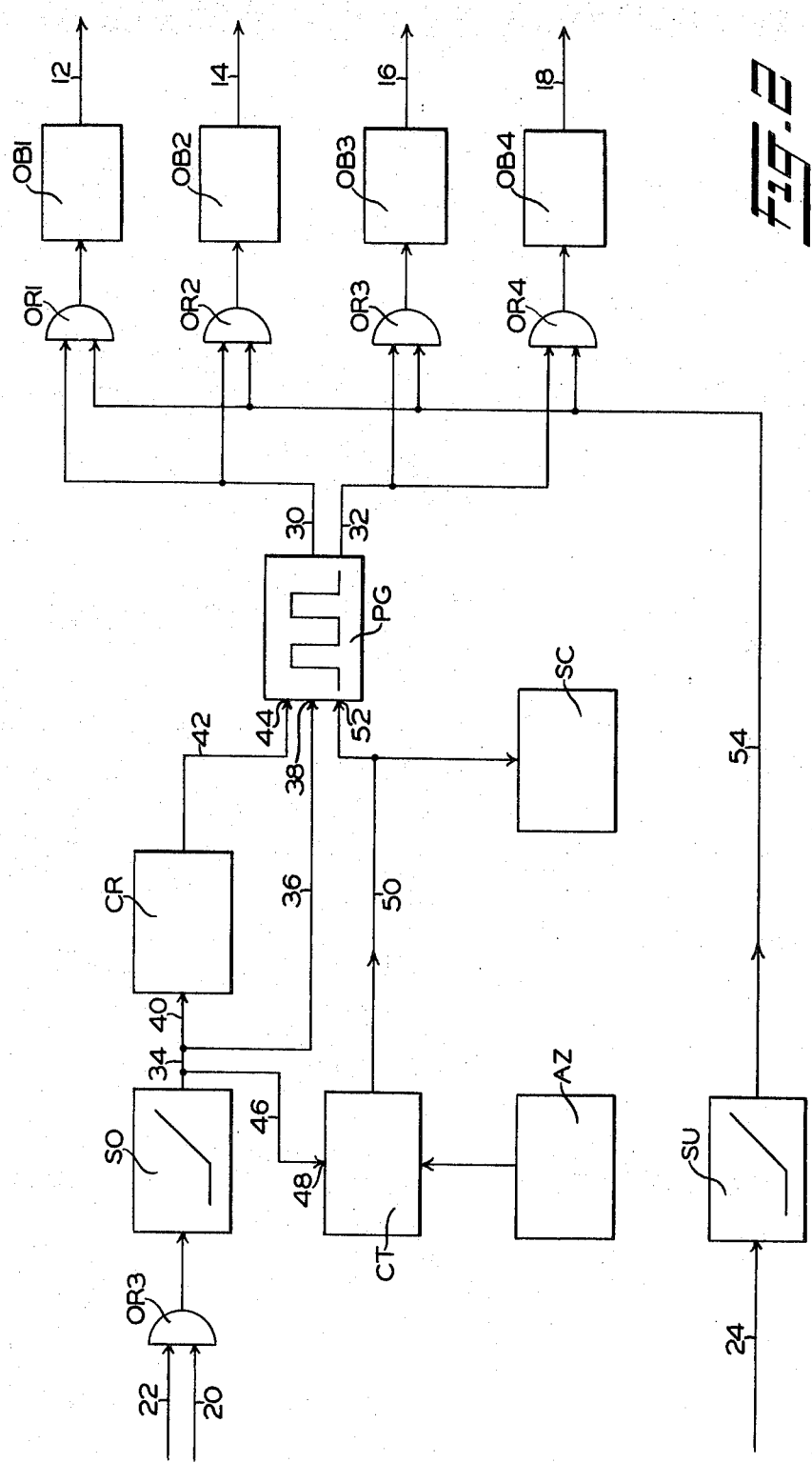

STATIC INVERTER

BACKGROUND OF THE INVENTION

Present day inverter devices producing square wave outputs of quasi-sinusoidal waveform typically employ controlled rectifier elements known as thyristors to effect the necessary switching of the load voltage. These inverters are subject to malfunction and possible damage due essentially to two different types of short circuits, which frequently occur. One type of short circuit occurs in the inverter itself when a thyristor fires spuriously, due for example to high voltage transients in the supply. The other type of short circuit can occur in the load controlled by the inverter. In either case, the phenomenon, often referred to as shoot-through, is manifested by a high flow of current from the source, usually resulting in the destruction of the thyristors in the inverter, since the thyristors are only capable of safely handling over-loads for a brief duration.

In order to protect against thyristor damage and/or inverter malfunction, ultra-fast fuse devices are normally employed to protect the thyristors in the event of an overload. It is to be understood, of course, that these fuses are not restorable and therefore become quite costly when replacement is necessary, especially where the use of high operating voltages require correspondingly larger and more expensive fuses.

It is apparent therefore that inverter operating costs increase considerably when operating in systems having high power requirements, especially when the system supply is subject to frequent voltage transients, as for example, in railroad vehicle operation in which the power is picked up from overhead power lines or a third rail along the wayside.

SUMMARY

The object of the present invention is to overcome the above mentioned disadvantages by providing a static inverter having built-in protection against short circuits appearing in either the inverter itself or the load controlled by the inverter.

It is another object of the invention to provide an inverter device capable of automatically returning to a normal operating condition subsequent to the disappearance of the condition generating a short circuit within the inverter.

It is still a further object of the invention to provide an inverter device in accordance with the above-mentioned objects which is capable of operating at two different supply voltages, one twice as high as the other, by making a simple change in the connections of the components comprising the inverter.

In accomplishing these objects, there is provided a static inverter device consisting of separate switching networks in which thyristors in series in each network normally enter into conduction alternatly and mutually exclusive of the thyristors in the other network. A control unit including pulse forming means generates the thyristor firing signals to alternate the direction of current flow in a load supplied from a d. c. source effective at the inverter input terminals across which is connected a low pass filter network. When the thyristors in the separate switching networks inadvertently enter conduction concurrently, causing a short circuit, current sensors associated with the filter network function to inhibit the control unit, thereby removing the firing signals to the thyristors, which remain in conduction only as long as current is capable of flowing in a forward conducting direction.

Inductors in series with the thyristors in the separate switching networks cooperate with the filter capacitor to form a simple L-C oscillator circuit when the thyristors enter into conduction concurrently. The equivalent filter capacitance and input inductance produce a period and Q-factor such that the free current oscillation generated reverses the voltage potential at the anode terminals of the thyristors in the short circuit during the second period of semi-oscillation for a duration sufficient to effectively extinguish the thyristors, which in the absence of the inhibited firing pulses, recover their forward bias characteristic and thereby interrupt further current flow in the inverter circuit.

Once the current sensors relieve the inhibit signal to the control unit, the thyristor firing signals will be restored and if the cause of the short circuit condition has been alleviated, the inverter will continue to operate without interruption. However, if the short circuit condition is still present, the above explained protective measure will be again implemented until after a predetermined number of cycles, as determined by a counter device, permanent shutdown of the inverter will occur.

Other objects, features and attendant advantages of the invention will become apparent from the following more detailed description when considered in view of the accompanying drawings in which:

FIG. 2 is a block diagram of the control unit comprising a part of FIG. 1;

Figure 1:
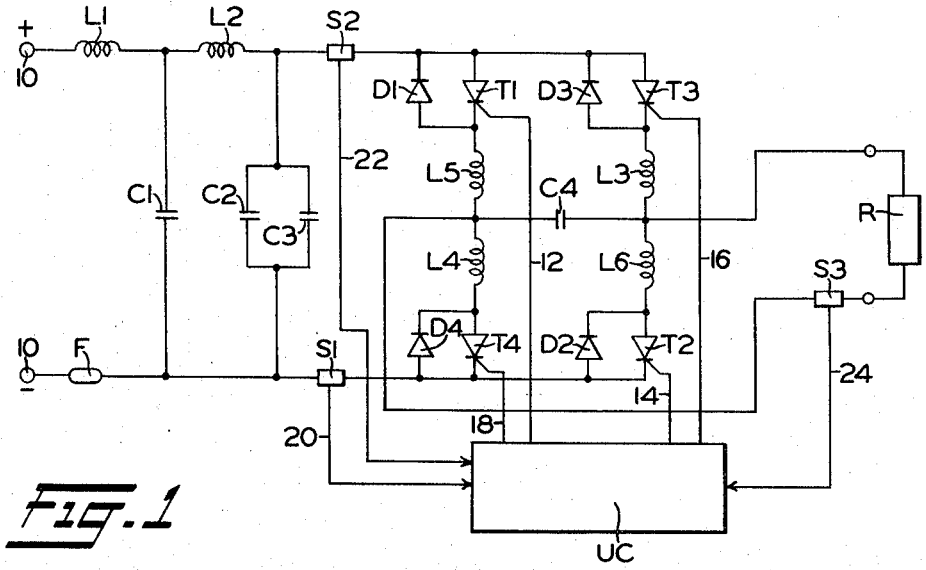
FIG. 1 is a circuit diagrammatic showing one embodiment of the present invention.

Referring to FIG. 1, there is shown the inverter of the present invention consisting of a low pass filter in the form of inductors L1, L2 and capacitors C1, C2 and C3 for removing high frequency ripple effective at the input terminals 10, which may represent, for example, an overhead or suspended railway supply line. The inverter further includes in a first switching network thyristors T1 and T2, free-wheeling diodes D1 and D2 in parallel respectively with thyristors T1 and T2, and inductors L5 and L6 connected to the opposite terminals of a load R in series with thyristors T1, T2; and in a second switching network an identical circuit configuration including thyristors T3 and T4, free-wheeling diodes D3 and D4, and inductors L3 and L4. Connected to the juncture of inductors L4, L5 and inductors L3, L6 are the terminals of a commutating capacitor C4 in parallel with load R. The general arrangement of these components is conventional, being well-known in the inverter art as a bridge configuration.

Connected to the gate control terminal of thyristors T1, T2, T3 and T4 via lines 12, 14, 16 and 18 respectively are the outputs of a control unit UC, hereinafter explained.

Provided in the inverter input lines downstream of the input filter network are current sensors S1 and S2, which may preferably be current transformers capable of transmitting a current signal to control unit UC via lines 20 and 21. A similar sensor S3 is provided in the supply line to load R for transmitting a current signal to control unit UC via line 24.

Upstream of the inverter there is inserted a fuse F of the time delay type for providing supplemental protection of the inverter components in the event of a malfunction of any of the devices responsible for protection of the inverter in accordance with the invention. Fuse F is selected so as to have a time delay period dependent upon the time required for the protection circuit of the invention to become effective.

Referring now to FIG. 2 control unit UC is shown broken down into its basic components, one of which is a pulse generator PG provided by a relaxation oscillator or an astable multivibrator, for example. Pulse generator PG produces output pulses on lines 30 and 32 having a predetermined phase relationship. The pulse signal effective on line 30 is connected to one input of a pair of OR gates OR1 and OR2, the respective outputs of which drive a pair of pulse shapers OB1 and OB2. Similarly, the pulse signal effective on line 32 is connected to one input of a pair of OR gates OR3 and OR4, the respective outputs of which drive a pair of pulse shapers OB3 and OB4. The OB1-OB4 outputs constitute the outputs of the control unit UC previously described as being connected via lines 12, 14, 16 and 18 to the control terminals of thyristors T1-T4, respectively. In that the output pulses of pulse generator PG are phase displaced, it should be recognized that thyristors T1 and T2 in the one switching network of the inverter are triggered in alternate sequence with the triggering of thyristors T3 and T4 in the other switching network.

Control unit UC also includes a threshold detector circuit 50 which is subject to the current supplied by sensors 51, 52 via an OR gate OR5. When the current detected by one of the sensors surpasses a preestablished threshold, an output signal is produced at line 34, indicating a short circuit. On one hand, the signal at line 34 is applied via line 36 to inlet 38 of pulse generator PG to inhibit the production of pulses at outputs 30 and 32 thereof; while on the other hand, the output of the threshold circuit is applied via line 40 to a timing circuit CR, which produces an output 42 after a predetermined duration. Output 42 is connected to an input 44 of pulse generator PG to enable operation of the pulse generator after a time delay imposed in accordance with the characteristics of circuit CR.

In addition, a counter device CT is provided to permanently disable pulse generator PG after a predetermined number of short circuit indications from threshold detector SO, the output 34 of which is connected via line 46 to inlet 48 of counter CT. Upon receipt of the third short circuit signal at output 34, for example, counter CT produces a signal at line 50 leading to input 52 of pulse generator PG and to a servo-control unit SC, which operates to control switches for cutting out the inverter or activating other protective devices located upstream of the inverter and for alerting the operating personnel.

Further included in control unit UC is a reset circuit AZ having a relatively long timing period, such as 10 minutes or more, for example, in order to prevent the accumultation of a signal count over a period of time by periodically applying a reset signal to counter CT. Thus, a predetermined number of successive short circuits, such as three, for example, are required within the timing period imposed by reset circuit AZ, in order to permanently inactivate the inverter.

Control unit UC still further consists of a threshold circuit SU subject to the current signal from sensor S3. Threshold circuit S4 produces an output at line 54 when a short circuit appears at the load R. The signal at line 54 is applied to the respective second inputs of each OR gate OR1 through OR4, in order to simultaneously fire all of the thyristors T1 through T4 and thereby create a short circuit at the inverter for a purpose, as hereinafter explained.

Under normal operating conditions, the inverter presented in FIGS. 1 and 2 functions in a conventional manner, with thyristor pairs T1, T2 and T3, T4 of the separate inverter switching networks being fired in alternate sequence in accordance with the outputs of pulse shapers OB1, OB2 and OB3, OB4 under control of pulse generator PG.

Figure 4:
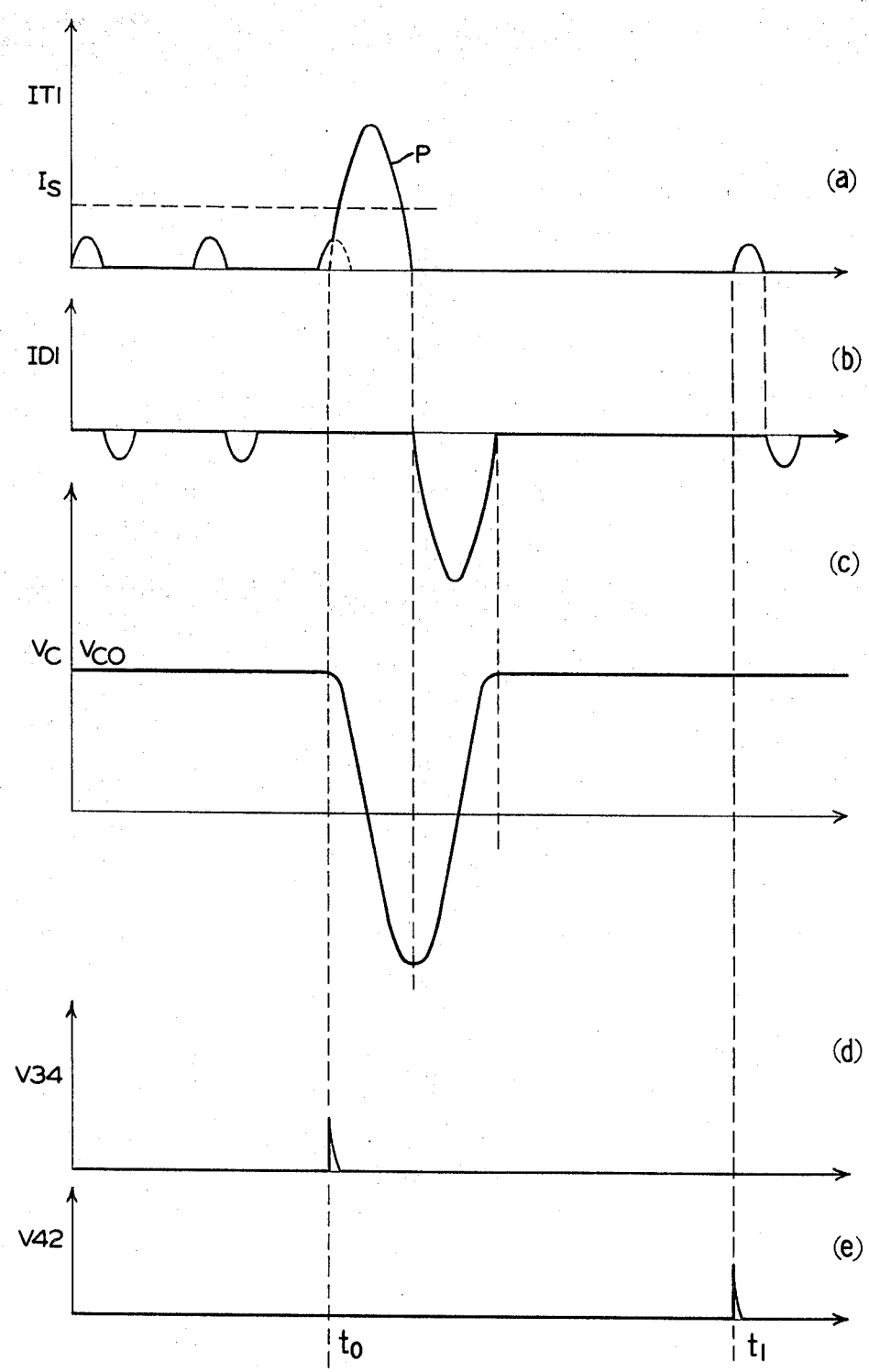
FIG. 4 is a graph of waveforms useful in attaining an understanding of the static inverter according to the present invention.

If it is now assumed that a short circuit occurs at the inverter, due for example to thyristor T4 being fired inadvertently or assuming a state of conduction without receiving a firing pulse, at the time thyristors T1, T2 are in a state of conduction, a short circuit will occur across thyristors T1 and T4. This is represented in FIG. 4 by graphs (a) and (b) which represent the current flow in thyristor T1 and diode D1, respectively. The short circuit current wave appearing at thyristor T1 is represented in graph (a) by P which increases rapidly and reaches a value which exceeds the threshold of circuit SO (FIG. 2). Accordingly, pulse generator PG is disabled by the signal produced at line 36 so as to terminate the firing signals normally controlling thyristors T1-T4 by way of pulse shapers OB1-OB4. It is to be understood however that the thyristors in conduction at the time will remain in conduction as long as the thyristors are subjected to current flow in a forward direction.

In the above assumption, it is seen that the path of easy current flow is via the shorted circuit of thyristors T1 and T4, which establishes an L–C type oscillator circuit including, in addition to the thyristors mentioned, inductors L4 and L5, as well as capacitors C2 and C3. This well-known oscillator circuit produces a flywheel effect to generate a free oscillation in the circuit, while inductance L2 uncouples the inverter input to prevent any upstream disturbances that the short circuit might produce.

As seen in graph (a), the short circuit current P rises, while in graph (c), capacitors C2, C3 begin to discharge. When $V_{co}$ becomes zero, the flux field surrounding inductors L4, L5 begins to collapse, charging capacitors C2, C3 in the opposite polarity, while the short circuit current P begins to decrease. The reverse charge on capacitors C2, C3 results in the inverter current being circulated in a reverse direction via diodes D4, D1 and inductors L4, L5, thereby reverse biasing thyristors T1 and T4 which, in the absence of a firing signal, as previously mentioned, stop conducting and consequently regain their forward blocking characteristic.

Following time $t_o$, when the threshold circuit SO is activated (graph $d$, FIG. 4), circuit CR restores pulse generator PG to an operative condition within a period of time corresponding to $t_1-t_o$ (graph $e$). At time $t_1$ therefore pulse generator PG restores the normal sequence of thyristor firing signals via OB1-OB4, so that if the short circuit condition is cleared, the inverter will continue to operate without further intervention of the protection circuitry.

If, however, the cause of the short circuit remains in effect, then as soon as pulse generator PG is restored to its active condition, the short circuit condition is detected by current sensors S1 or S2 and the threshold detector circuit SO again responds to disable pulse generator PG. After a predetermined number of such cycles, counter CT, which receives a pulse count each time the threshold circuit senses a short circuit condition, permanently disables pulse generator PG and activates servo-control unit SC to interrupt power from the inverter and alert the operator to the malfunction. In this manner, an indefinite number of intervention cycles of the protection system is prevented, which otherwise could cause permanent damage to the inverter components, especially thyristors T1-T4 and fuse F. Counter CT is reset periodically by reset circuit AZ, in order to dispose of any accumulated count, which would otherwise render pulse generator PG permanently disabled prematurely, i. e., before the predetermined number of cycles of intervention of the protection circuit have occurred.

In the event the operating malfunction occurs downstream of the inverter, such as a short circuit in load R for example, then sensor S3 together with threshold circuit SU responds to the short circuit condition. Since output S4 of threshold circuit SU is connected to each OR gate OR1-OR4, the normal sequence of firing signals produced by pulse shaping circuits OB1-OB4, under control of pulse generator PG, is overriden and the outputs 12, 14, 16 and 18 are accordingly generated concurrently. This results in the thyristors T1, T2 and T3, T4 in the separate inverter switching networks being fired to produce an artificial short circuit condition at the inverter. This short circuit condition appears across both of the separate inverter switching networks as opposed to the short circuit across only one switching network in the previous example, and thus yields an oscillating circuit consisting, in addition to capacitors C2 and C3, the two groups of series inductors L4, L5 and L3, L6. The current wave generated upstream of the inverter due to the short circuit is detected by one of the sensors S1, S2 and the same series of events as described earlier is repeated, the only difference being in the frequency of the free oscillation of the resulting L-C circuit, due to the additional inductance.

Accordingly, in order to achieve successful protection in either of the above instances, where a malfunction causes threshold circuits SO or SU to operate, it is necessary to design capacitors C2 and C3, as well as the circuit inductors L3, L4, L5 and L6, so that the oscillating circuit created when a short circuit appears is provided with a Q-factor having a magnitude which permits the voltage $V_c$ of capacitors C2, C3 to assume negative values for a period of time sufficient to positively force thyristors T1-T4 into a non-conducting condition. Also, the period of oscillation of such an L-C circuit should be relatively short because the peak short-circuit current in the thyristors should not last long enough to cause damage. Of course, the same holds true when the oscillating circuit consists of the inductor pairs L4, L5 or L3, L6 or when the oscillating circuit consists of all four inductors L3, L4, L5 and L6.

Figure 3:
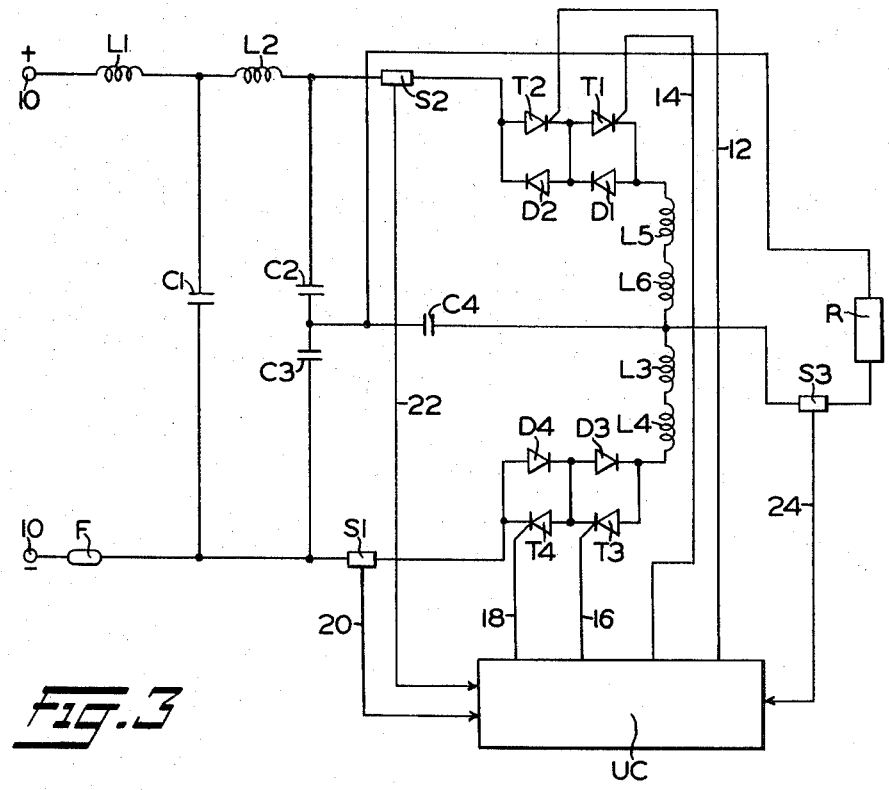
FIG. 3 is a second embodiment of the invention shown in circuit diagrammatic form.

In the circuit of FIG. 3 is shown an alternate arrangement of the inverter system of the present invention, which includes, in addition to the identical control unit UC of FIG. 2, the same power components shown in FIG. 1, but connected so as to allow the inverter supply voltage to be twice as great as in FIG. 1. This is accomplished by effecting a center tap connection of one load terminal between capacitors C2 and C3 while switching the other load terminal connection between the positive and negative input terminals, in accordance with current flow via thyristors T1, T2 or T3, T4 respectively.

It is to be understood from the foregoing that the principles of the present invention can also be applied to other classes of inverter circuits and that the control unit can be accomplished in a different manner without departing from the essential function of interrupting the thyristor firing signals in response to a short circuit being detected.

It should also be understood that the single thyristors shown in the drawings may be substituted for by groups of thyristors arranged in series and/or in parallel, whenever this is required by operating conditions using higher voltages and/or currents. Furthermore, it is quite evident that the load can be a resistive load or a motor, for example.

Having now described the invention, what we claim as new and desire to secure by Letters Patent, is:

1. A static inverter system controlling the supply of a continuous source of voltage to a load comprising:
   a. an inverter switching network having at least two destinct paths via which current flow is conducted to said load, said switching network including in each of said paths series related thyristor and inductor components,
   b. control means for alternately firing said thyristors in one of said distinct paths mutually exclusive of said thyristors in another of said distinct paths,
   c. a filter capacitor network across the input terminals of said inverter system,
   d. a first current sensor subject to current flow in said filter network for effecting disablement of said control means when the current flow exceeds a predetermined level responsive to a short circuit occurring across the input terminals of said switching network, and
   e. said inductor components of said switching network cooperating with the capacitor of said filter network to produce an oscillating circuit when said thyristors in said distinctive paths enter into concurrent conduction to cause said short circuit, said oscillator circuit producing a free oscillation of current to reverse bias of said thyristors during the second semi-period of said free oscillation for a sufficient duration to cause said thyristors to terminate current flow in said switching network.

2. A static inverter system, as recited in claim 1, further characterized by the fact that the Q-factor of said oscillating circuit is of a relatively high value in order to produce an oscillation period of sufficient duration to cause interruption of the forward conducting characteristic of said thyristors and brief enough to prevent the current of the short circuit from damaging said thyristors.

3. A static inverter system, as recited in claim 1, wherein said control means comprises:
   a. pulse generator means operative to produce alternate firing signals to the thyristors in said distinct paths, and
   b. a first threshold circuit connected to the output of said first current sensor to provide a signal for disabling operation of said pulse generator means when the output of said current sensor exceeds said predetermined level.

4. A static inverter system, as recited in claim 3, wherein said control means further comprises a delay circuit subject to said current sensor signal for providing a reset signal to enable operation of said pulse generator means a first predetermined time interval following disablement of said pulse generator means.

5. A static inverter system, as recited in claim 4, wherein said control means further comprises counter means subject to said current sensor signal for permanently disabling operation of said pulse generator means in response to the occurrence of a predetermined number of said current sensor signals being registered by said counter means.

6. A static inverter system, as recited in claim 5, wherein said control means further comprises timing circuit means for producing a second predetermined time interval of duration significantly longer than said first predetermined time interval and providing a reset signal following expiration of said second time interval to periodically restore said counter means to a zero count setting.

7. A static inverter system, as recited in claim 3, wherein said control means further comprises:
   a. a second current sensor subject to current flow in said load, and
   b. a second threshold circuit connected to the output of said second current sensor to effect simultaneous firing of said thyristors in each of said distinct paths when the output of said current sensor exceeds said predetermined level to artificially produce said short circuit.

8. A static inverter, as recited in claim 7, wherein said control means further comprises a plurality of OR gates corresponding in number to said thyristors, one input of different pairs of said OR gates being subject to the alternate firing signals of said pulse generator means and a second input of each of said OR gates being subject to the output of said second threshold circuit.

* * * * *